J. H. HOARD.
HARROW TOOTH HOLDER.
APPLICATION FILED OCT. 20, 1909.

975,132.

Patented Nov. 8, 1910.
2 SHEETS—SHEET 1.

Witnesses
W. N. Woodson
Juana M. Fallin

Inventor
J. H. Hoard
By H. A. M. Lacey, Attorneys

J. H. HOARD.
HARROW TOOTH HOLDER.
APPLICATION FILED OCT. 20, 1909.
975,132.
Patented Nov. 8, 1910.
2 SHEETS—SHEET 2.
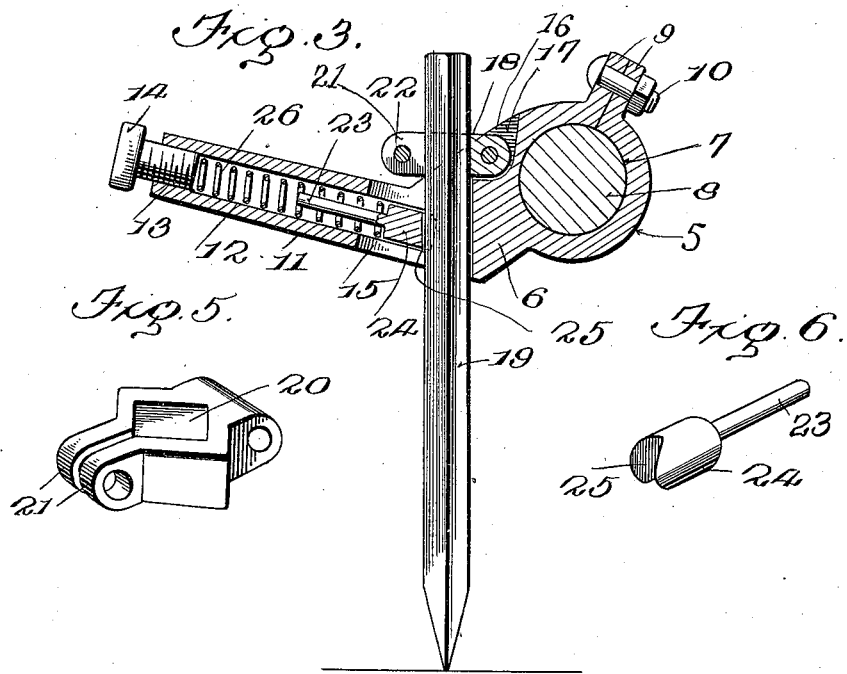
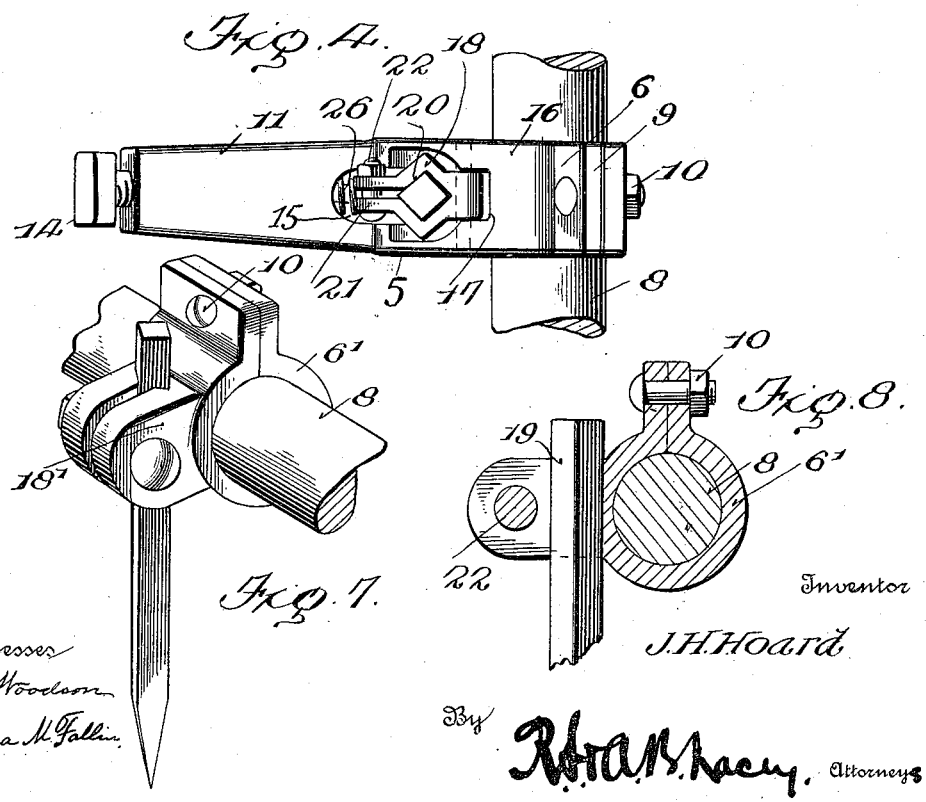
Inventor
J. H. Hoard

UNITED STATES PATENT OFFICE.

JOHN H. HOARD, OF PURMELA, TEXAS.

HARROW-TOOTH HOLDER.

975,132.  Specification of Letters Patent.  Patented Nov. 8, 1910.

Application filed October 20, 1909. Serial No. 523,662.

*To all whom it may concern:*

Be it known that I, JOHN H. HOARD, citizen of the United States, residing at Purmela, in the county of Coryell and State of Texas, have invented certain new and useful Improvements in Harrow-Tooth Holders, of which the following is a specification.

This invention relates to harrows and more particularly to improved means for supporting the teeth in position on the frame of the harrow.

The object of the invention is to provide a tooth holder capable of being readily attached to or detached from the tooth bar of a harrow, and which may be adjusted longitudinally of said bar or rotated on the bar so as to change the position of the active end of the tooth with respect to the surface of the ground.

A further object is to provide a tooth holder, the construction of which is such that the tooth is free to yield rearwardly when traveling over stumps, rocks or the like, thereby to prevent breakage.

A still further object of the invention is generally to improve this class of devices so as to increase their utility, durability and efficiency, as well as to reduce the cost of manufacture.

Further objects and advantages will appear in the description, it being understood that various changes in form, proportions and minor details of construction may be resorted to within the scope of the appended claims.

For a full understanding of the invention reference is to be had to the following description and accompanying drawings, in which:—

Figure 1:
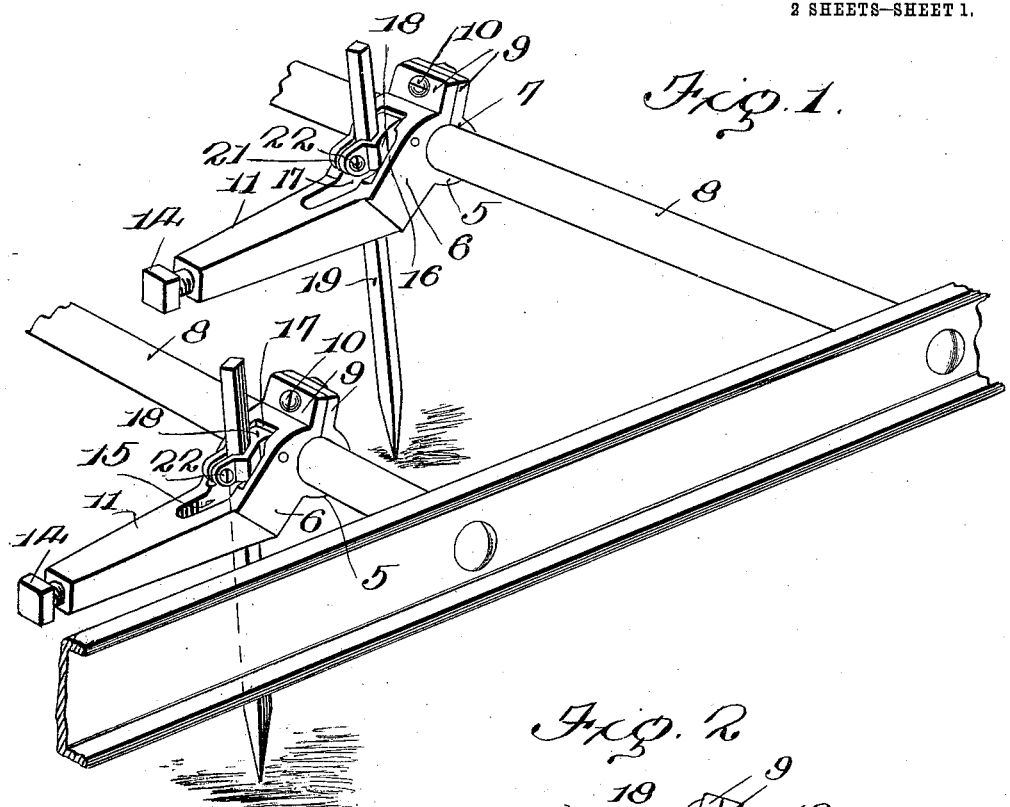
Figure 2:
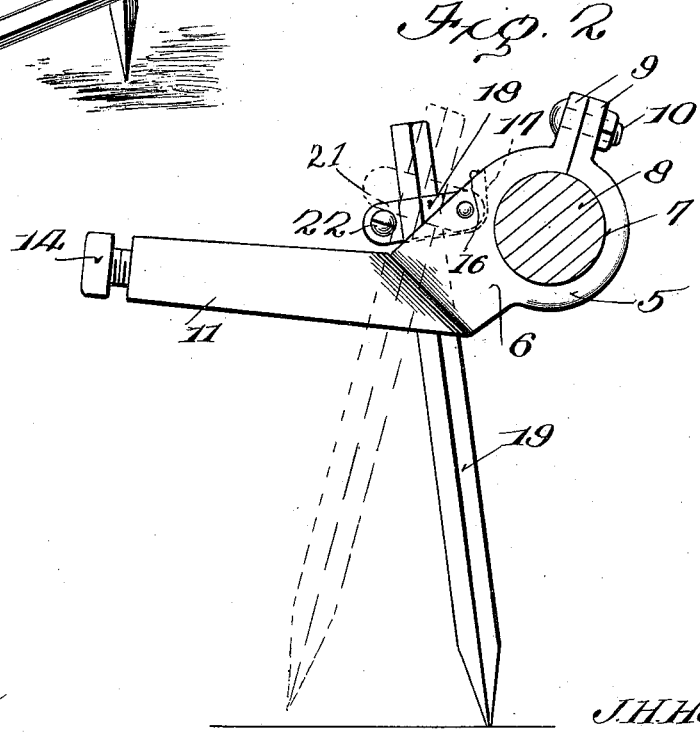

Figure 1 is a perspective view of a portion of a harrow provided with a holder constructed in accordance with my invention. Fig. 2 is a side elevation, the tooth supporting bar being shown in section. Fig. 3 is a longitudinal sectional view. Fig. 4 is a top plan view. Fig. 5 is a detail perspective view of the tooth clamp detached. Fig. 6 is a detail perspective view of the plunger detached. Fig. 7 is a perspective view illustrating a modified form of the invention. Fig. 8 is a vertical sectional view of Fig. 7.

Corresponding and like parts are referred to in the following description and indicated in all the views of the accompanying drawings by the same reference characters.

The device comprises a holder 5 having a head 6 pierced by a longitudinal opening 7 for the reception of a tooth bar 8, said head being split transversely to produce spaced ears 9 having transversely alined openings formed therein, and in which is seated a bolt or similar fastening device 10, which bolt serves to clamp the holder in position on the tooth bar 8.

Secured to and extending rearwardly from one end of the head 6 is a shank 11 having a central longitudinally disposed bore 12, one end of which is threaded at 13 for the reception of the correspondingly threaded end of an adjusting screw 14, there being a vertically disposed slot 15 formed in the shank 11 and communicating with the bore 12, as shown.

The inclined face 16 of the head is provided with a seating recess 17 in which is pivotally mounted a clamp 18 adapted to receive the harrow tooth indicated at 19. The clamp 18 is provided with an angular socket 20 for the reception of the harrow tooth 19, and is provided with laterally extending ears 21 adapted to be drawn together by a bolt or similar fastening device 22 for the purpose of retaining the tooth in position on the clamp.

Slidably mounted in the bore 12 is a plunger 23 having an enlarged head 24, the free end of which is provided with a V-shaped socket 25 which receives the adjacent portion of the harrow tooth 19. A coil spring 26 is interposed between the head 24 of the plunger and the threaded end of the screw 14, for the purpose of normally and yieldably supporting the harrow tooth in operative position. Thus it will be seen that the lower or active end of the tooth 19 is yieldably supported in engagement with the adjacent wall of the slot 15 so as to permit the harrow tooth to tilt rearwardly when passing over stumps, rocks and the like, and thereby prevent breakage, the tension of the spring 26 being adjusted by rotating the screw 14.

Attention is here called to the fact that by loosening the fastening device 10, the holder may be rotated, or partially rotated upon the tooth bar 8 so as to raise or lower the active end of the tooth with respect to the surface of the ground, or said holder may be adjusted longitudinally of the tooth bar 8 to vary the distance between the harrow teeth, said holder being secured in adjusted position by tightening the bolt or fastening device 10. It will also be noted that the V-shaped socket 25 slidably engages the adjacent walls of the harrow tooth when the latter is tilted, and serves to assist in guiding and centering said harrow tooth with respect to the slot 15.

In Figs. 7 and 8 of the drawings, there is illustrated a modified form of the invention in which the shank 11 is dispensed with, the clamp 18' being rigidly secured to the head 6' and the harrow tooth rigidly supported on the clamp, instead of being yieldably supported as illustrated in Fig. 1. It will be noted, however, that both holders are mounted for rotary and longitudinal movement on the tooth bar, while the harrow teeth are adjustable vertically within the clamps so as to regulate the depth of penetration of the lower or active ends of the teeth into the surface of the ground, according to the particular kind of land or nature of the soil being tilled.

Having thus described the invention what is claimed as new is:—

1. The combination with a supporting bar, of a tubular tooth holder mounted for rotary and longitudinal movement on the bar and provided with spaced laterally extending ears, a clamp carried by the holder and provided with spaced vertically disposed ears arranged on one side of said bar, a harrow tooth slidably mounted for vertical movement between the ears of the clamp and movable in a plane at substantially right angles to the supporting bar and independently of the latter, a fastening device extending horizontally through the ears of the clamp for securing the harrow tooth in different positions of vertical adjustment, and a fastening device piercing the ears of the tooth holder for clamping the latter in adjusted position on the supporting bar.

2. The combination with a supporting bar, of a holder mounted for longitudinal and rotary movement on the bar, a clamp pivotally mounted for vertical movement on the holder, a harrow tooth carried by the clamp mounted on the holder, and means for yieldably supporting the harrow tooth in normal position.

3. The combination with a supporting bar, of a holder mounted for longitudinal and rotary movement on the bar, a clamp pivotally mounted for vertical movement on the holder and a harrow tooth carried by and adjustable vertically of the clamp.

4. The combination with a supporting bar, of a holder carried by the bar, a clamp pivotally mounted on the holder, a harrow tooth carried by and adjustable vertically of the clamp, a spring actuated plunger normally bearing against the harrow tooth for holding the latter in operative position.

5. The combination with a supporting bar, of a holder secured to the bar and provided with a longitudinally disposed shank, a clamp pivotally mounted on the holder, a harrow tooth carried by the clamp and having its active end extending through the shank of the holder, and a spring mounted in the shank and normally bearing against the harrow tooth.

6. The combination with a supporting bar, of a holder secured to the bar and provided with a longitudinally disposed shank, a clamp pivotally mounted on the holder and provided with laterally extending perforated ears, a harrow tooth adjustable vertically of the clamp and having its active end extending through the shank, a fastening device piercing the perforations in the ears of the clamp for retaining the harrow tooth in adjusted position, and means carried by the shank and bearing against the tooth for normally holding the latter in operative position.

7. The combination with a supporting bar, of a holder secured to the bar, and provided with a shank having a longitudinal bore pierced by a transverse slot, a clamp pivotally mounted on the holder, a harrow tooth carried by the clamp and extending through the slot in the shank, a plunger slidably mounted in the bore and normally bearing against the harrow tooth, a spring encircling the plunger, and an adjusting screw threaded in one end of the shank and normally bearing against the spring for adjusting the tension of the latter.

8. The combination with a supporting bar, of a holder having one end thereof provided with a head, having a transverse slot for the reception of the supporting bar and provided with laterally extending clamping ears, a shank extending laterally from the head and having a longitudinal bore pierced by a vertically disposed slot, a clamp pivotally mounted on the head, a harrow tooth carried by the clamp and having its active end extending through the slot in the shank, a plunger operating within the bore and normally bearing against the tooth for yieldably supporting the latter in operative position.

9. The combination with a supporting bar, of a holder mounted for longitudinal and rotary movement on the bar and provided with a shank having a longitudinal bore intersected by a vertical slot, a clamp pivotally mounted on the holder and having an angular socket and spaced perforated ears, a harrow tooth seated in the socket and having its active end extending through the slot in the shank, a fastening device piercing the ears for clamping the tooth in adjusted position, a plunger slidably mounted in the bore, and having one end thereof provided with a V-shaped recess for the reception of the adjacent portion of the harrow tooth, a spring encircling the plunger and an adjusting screw threaded in one end of the shank for regulating the tension of the spring.

10. The combination with a supporting bar, of a holder having one end thereof provided with a split head having a transverse opening for the reception of the bar, and provided with an inclined face having a seating recess formed therein, there being a shank extending laterally from the head at the inclined face thereof and provided with a longitudinal bore intersected by a vertical slot, a clamp pivotally mounted in the recess and having an angular socket formed therein, a harrow tooth slidably mounted for vertical movement in the socket, and having its active end extending through the slot in the shank, means for clamping the harrow tooth in adjusted position, a plunger slidably mounted in the bore of the shank and having one end thereof provided with an enlarged head having a terminal V-shaped recess adapted to receive the adjacent portion of the harrow tooth, a coil spring encircling the plunger, and an adjusting screw threaded in the free end of the shank and bearing against the spring for regulating the tension of the latter.

11. The combination with a supporting bar, of a holder mounted for longitudinal and rotary movement on the bar, a clamp pivotally mounted on the holder, a harrow tooth carried by the clamp and adjustable vertically of the clamp and independently of the holder, and means carried by the holder and bearing against the harrow tooth for yieldably supporting the latter in normal position.

In testimony whereof I affix my signature in presence of two witnesses.

JOHN H. HOARD. [L. S.]

Witnesses:
O. F. WELLS,
F. P. CARDWELL.